US011340449B2

(12) United States Patent
Liao et al.

(10) Patent No.: US 11,340,449 B2
(45) Date of Patent: May 24, 2022

(54) METHOD FOR DESIGNING OPTICAL LENS WITH UNEQUAL THICKNESS

(71) Applicant: Suzhou LYlap Mould Technology Co., Ltd., Jiangsu (CN)

(72) Inventors: Wenliang Liao, Suzhou (CN); Xiangjun Liao, Suzhou (CN)

(73) Assignee: Suzhou LYlap Mould Technology Co., Ltd.

( * ) Notice: Subject to any disclaimer, the term of this patent is extended or adjusted under 35 U.S.C. 154(b) by 260 days.

(21) Appl. No.: 16/766,276

(22) PCT Filed: Oct. 30, 2018

(86) PCT No.: PCT/CN2018/104932
§ 371 (c)(1),
(2) Date: May 21, 2020

(87) PCT Pub. No.: WO2019/100815
PCT Pub. Date: May 31, 2019

(65) Prior Publication Data
US 2020/0371348 A1 Nov. 26, 2020

(30) Foreign Application Priority Data

Nov. 22, 2017 (CN) .......................... 201711169852.3

(51) Int. Cl.
*G02B 27/00* (2006.01)
*G02B 3/02* (2006.01)

(52) U.S. Cl.
CPC ........... *G02B 27/0012* (2013.01); *G02B 3/02* (2013.01)

(58) Field of Classification Search
CPC ............................. G02B 27/0012; G02B 3/02
USPC ......................................................... 359/642
See application file for complete search history.

(56) References Cited

U.S. PATENT DOCUMENTS 2,675,738 A * 4/1954 Ellis ................... G01M 11/0221
356/127

FOREIGN PATENT DOCUMENTS

CN 103592702 A * 2/2014

* cited by examiner

*Primary Examiner* — Nicholas R. Pasko
*Assistant Examiner* — Mitchell T Oestreich

(57) ABSTRACT

A method for designing an optical lens with unequal thickness, comprising the steps of: (1) establishing a lens model in an optical software; (2) simulating a beam of incident light, and observing whether the incident light and the exit light are parallel; (3) if the incident light and the exit light are parallel, recording the curvatures and thicknesses of the incident surface and the exit surface of the lens model, and preliminarily preparing a lens; if the incident light and the exit light are unparallel, adjusting the thickness between the incident surface and the exit surface of the lens model until the incident light and the exit light are parallel, then recording the curvatures and thicknesses of the incident surface and the exit surface, and then preliminarily preparing a lens; (4) verifying whether the prepared lens is qualified, and if it is unqualified, returning to step (2). The present disclosure achieves clear imaging through mitigating or eliminating the distortion, which protects a user from feeling dizzy after long-term use.

6 Claims, 8 Drawing Sheets

METHOD FOR DESIGNING OPTICAL LENS WITH UNEQUAL THICKNESS

This application claims the benefit of Chinese patent application No. 2017111698523, filed Nov. 22, 2017, titled "METHOD FOR DESIGNING OPTICAL LENS WITH UNEQUAL THICKNESS", and all contents are hereby incorporated herein by reference.

TECHNICAL FIELD

This disclosure relates to a method for designing an optical lens with unequal thickness.

BACKGROUND

With technological progress, lenses are widely used in various fields and our daily lives. Due to the design principle, the thickness of most conventional lenses is equal. However, the lenses with equal thickness fail to achieve clear imaging as the distortion of the image cannot be eliminated. The poor visual effect makes users unsatisfied.

SUMMARY

The purpose of the present disclosure is to provide a method for designing an optical lens with unequal thickness, which achieves clear imaging and zero distortion through adjusting the thickness between the incident surface and the exit surface of the optical lens.

To achieve the above purpose, the present disclosure adopts the following technical solution: a method for designing an optical lens with unequal thickness, comprising establishing an optical lens model in an optical software, wherein establishing the optical lens model comprises determining a size of the optical lens and a thickness between an incident surface and an exit surface of the optical lens according to curvatures of the incident surface and the exit surface of the optical lens; simulating a light to enter through the incident surface and exit through the exit surface of the optical lens; determining whether the light enter through the incident surface and the light exit through the exit surface are parallel; recording the curvatures and thicknesses in response to determining that the light enter through the incident surface and the light exit through the exit surface are parallel; adjusting the thickness until the light enter through the incident surface and the light exit through the exit surface are parallel and recording the curvatures and the adjusted thickness in response to determining that the light enter through the incident surface and the light exit through the exit surface are unparallel; preparing the optical lens based on the recorded curvatures and thicknesses; determining whether the prepared optical lens requires fine adjustment, wherein determining whether the prepared optical lens requires fine adjustment comprises: arranging a light source and a receiving screen, wherein arranging the light source and the receiving screen comprises placing the receiving screen at a plurality of distances from the light source; recording a first position and a first size of a light projected on the receiving screen; placing the prepared optical lens in between the light source and the receiving screen; recording a second position and a second size of the light projected on the receiving screen; and determining whether the first position and the first size are the same as the second position and the second size; determining the prepared optical lens requires fine adjustment in response to determining that the first position and the first size are not the same as the second position and the second size; and determining the prepared optical lens does not require fine adjustment in response to determining that the first position and the first size are the same as the second position and the second size; obtaining a finished optical lens in response to determining that the prepared optical lens does not require fine adjustment; and adjusting the prepared the optical lens in response to determining that the prepared optical lens requires fine adjustment.

In another aspect of the present disclosure, the light source is a parallel light source, and the light is a parallel light.

In another aspect of the present disclosure, the prepared optical lens has a lens center and a lens periphery, and the curvature radius of the prepared optical lens gradually increases from the lens center to the lens periphery.

In another aspect of the present disclosure, the prepared optical lens is made of plastic or glass.

In another aspect of the present disclosure, the prepared optical lens is an aspheric lens, and the aspheric lens is a semi-ellipse, an arc trapezoid or a rectangle.

In another aspect of the present disclosure, the method further includes preparing a mold for manufacturing the finished lens according to a finished lens model in the optical software.

Through the adjustment of the thickness between the incident surface and the exit surface of the optical lens, incident light is parallel to the exit light, which achieves clear imaging and zero distortion, so that the user is protected from feeling dizzy after long-term use.

The above is merely a brief description of the technical solution of the present disclosure. To make the technical means of the present disclosure clear and to implement the technical solution according to the specification, figures and preferred embodiments are combined hereinafter to further describe the technical solution of the present disclosure.

DETAILED DESCRIPTION

Figures and preferred embodiments are combined hereinafter to further elaborate the implementation techniques of the present disclosure. The following embodiments are merely used for describing the present disclosure but not limiting the scope of the present disclosure.

Figure 1:
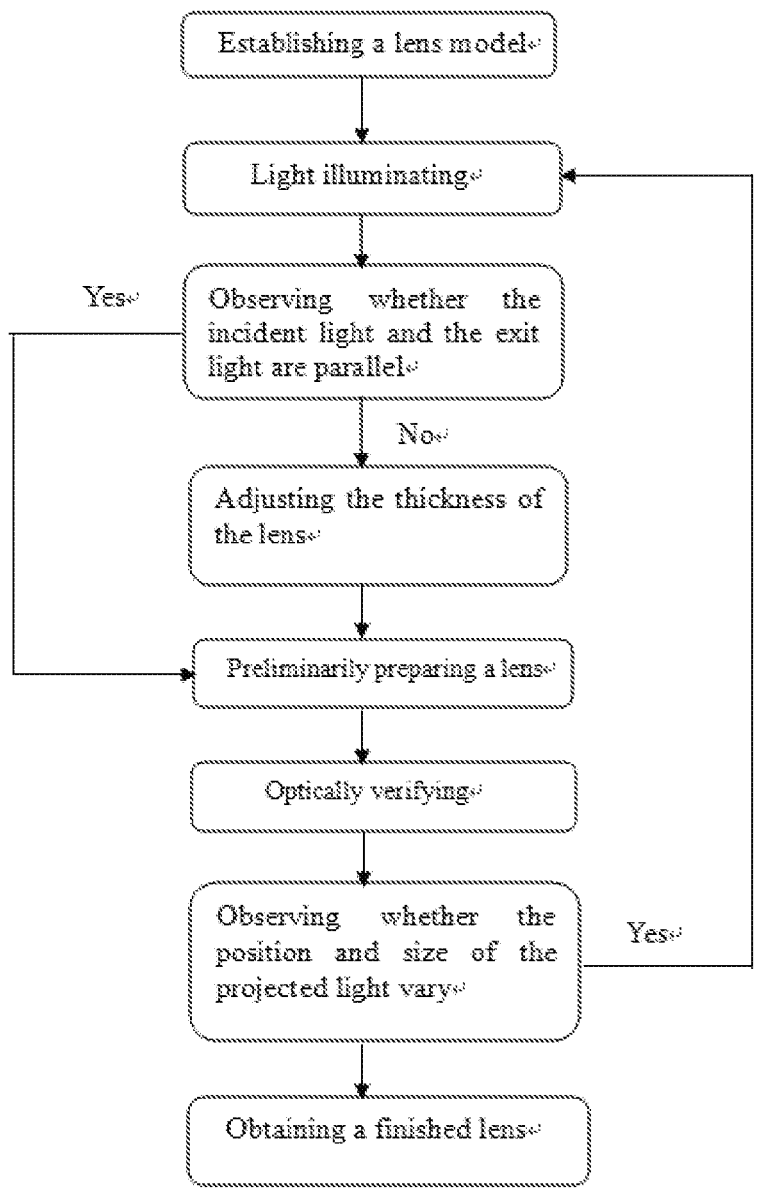
FIG. 1 is a flow chart illustrating the method for designing an optical lens with unequal thickness of the present disclosure.

As shown in FIG. 1, in a preferred embodiment of the present disclosure, a method for designing an optical lens with unequal thickness, comprising the steps of:

S1: establishing a lens model in an optical software, determining the size of the lens model, and preliminarily determining the thickness of the lens model according to the curvatures of an incident surface and an exit surface of the lens model;

S2: simulating a beam of incident light, enabling the light to enter through the incident surface and exit through the exit surface of the lens model, and observing whether the incident light and the exit light are parallel;

S3: if the incident light and the exit light are parallel, recording the curvatures and thicknesses of the incident surface and the exit surface of the lens model, and preliminarily preparing a lens; if the incident light and the exit light are unparallel, adjusting the thickness between the incident surface and the exit surface of the lens model until the incident light and the exit light are parallel, then recording the curvatures and thicknesses of the incident surface and the exit surface, and then preliminarily preparing a lens;

S4: arranging a light source and a receiving screen, turning on the light source, placing the receiving screen at different distances from the light source, and recording the positions and sizes of the light projected on the receiving screen, wherein at this point, the position and size of the projected light remain unchanged; subsequently, placing the prepared lens in between the light source and the receiving screen, turning on the light source, placing the receiving screen at different distances from the light source, and recording the positions and sizes of the light projected on the receiving screen; if the position and size of the projected light do not vary, obtaining a finished lens; if the position and size of the projected light vary, returning to S2, repeating S2 and S3 until the position and size of the light projected on the receiving screen remain unchanged after placing the prepared lens in between the light source and the receiving screen.

Figure 2A:
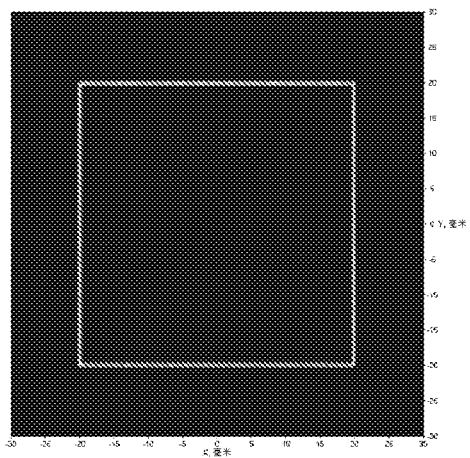
FIG. 2a is a conceptual diagram illustrating an illuminance distribution when the receiving screen is 0.5 meters away from the light source.
Figure 2B:
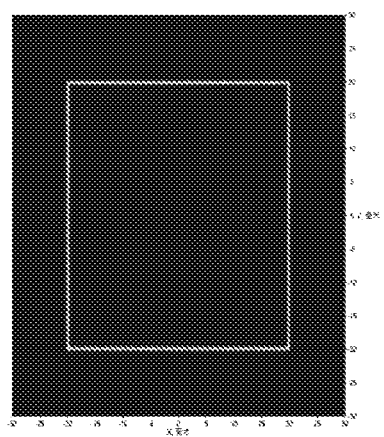
FIG. 2b is a conceptual diagram illustrating an illuminance distribution when the receiving screen is 1 meter away from the light source.
Figure 2C:
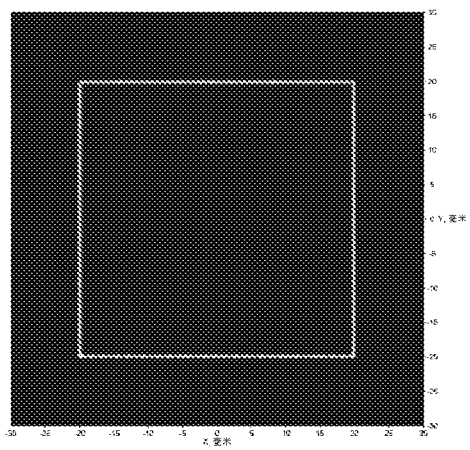
FIG. 2c is a conceptual diagram illustrating an illuminance distribution when the receiving screen is 2 meters away from the light source.

In this embodiment, the light source is a parallel light source, and the incident light is a parallel light. The parallel light source comprises four small light tubes with a length of 40 millimeters, which form a rectangular enclosure. The receiving screen is respectively placed 0.5 meters, 1 meter and 2 meters away from the light source, then the light source is turned on, and then whether the position and size of the light pattern projected on the receiving screen vary is observed. As shown in FIGS. 2a-2c, the position and size of the light pattern projected on the receiving screen do not vary when there is no object placed between the light source and the receiving screen. Namely, despite the variation of distance between the receiving screen and the light source, the position and size of the light pattern projected on the receiving screen remain unchanged.

Figure 3A:
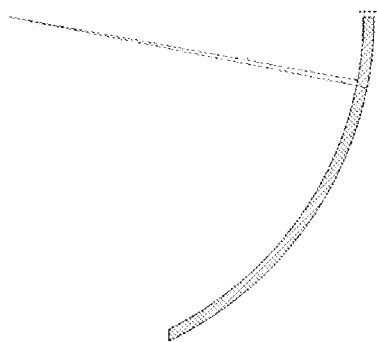
FIG. 3a is a conceptual diagram illustrating a conventional lens with equal thickness.
Figure 3B:
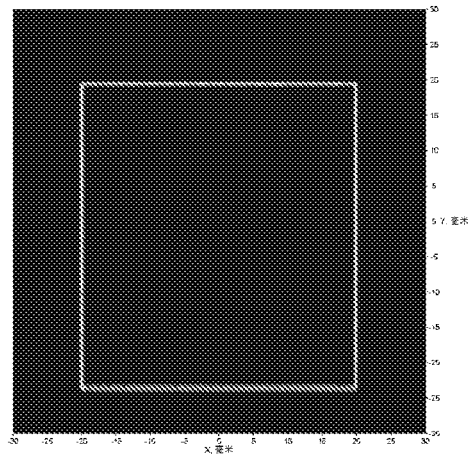
FIG. 3b is a conceptual diagram illustrating an illuminance distribution when the light passes through the lens with equal thickness and is projected on the receiving screen placed 0.5 meters away from the light source.
Figure 3C:
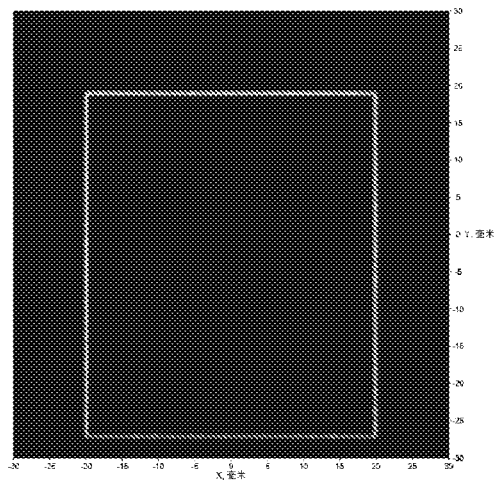
FIG. 3c is a conceptual diagram illustrating an illuminance distribution when the light passes through the lens with equal thickness and is projected on the receiving screen placed 1 meter away from the light source.
Figure 3D:
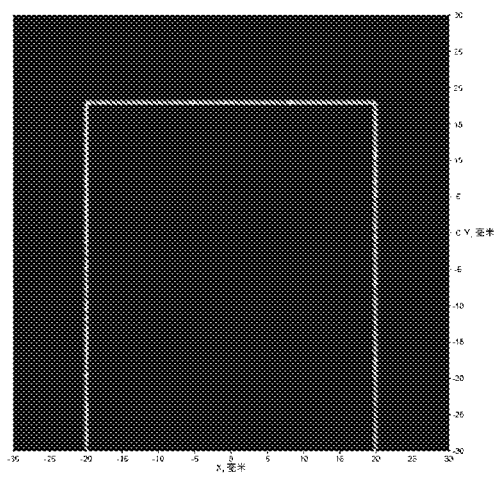
FIG. 3d is a conceptual diagram illustrating an illuminance distribution when the light passes through the lens with equal thickness and is projected on the receiving screen placed 2 meters away from the light source.
Figure 4A:
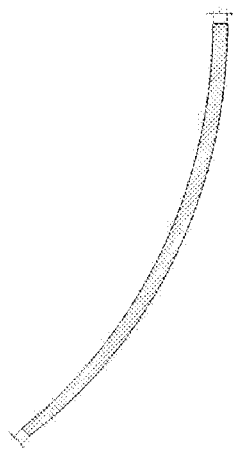
FIG. 4a is a conceptual diagram illustrating an example structure of the optical lens with unequal thickness of the present disclosure.
Figure 4B:
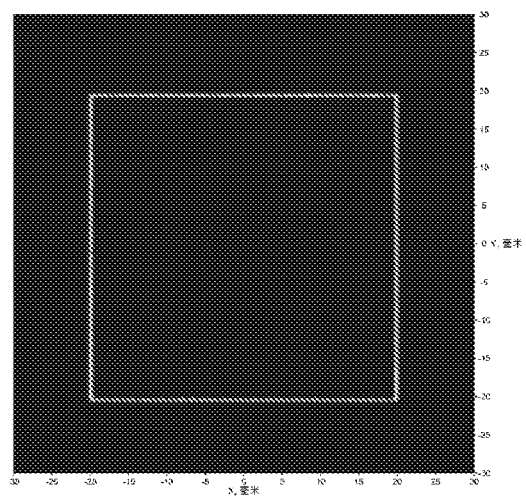
FIG. 4b is a conceptual diagram illustrating an illuminance distribution when the light passes through the lens with unequal thickness of the present disclosure and is projected on the receiving screen placed 0.5 meters away from the light source.
Figure 4C:
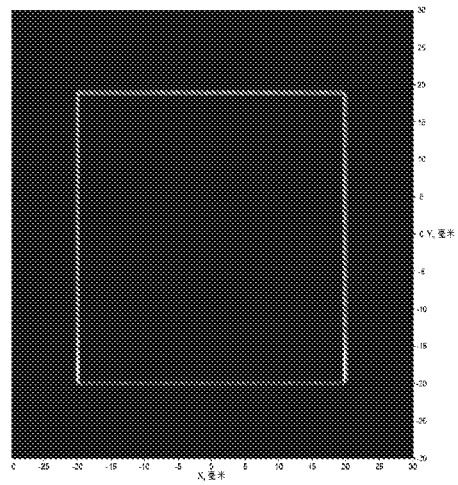
FIG. 4c is a conceptual diagram illustrating an illuminance distribution when the light passes through the lens with unequal thickness of the present disclosure and is projected on the receiving screen placed 1 meter away from the light source.
Figure 4D:
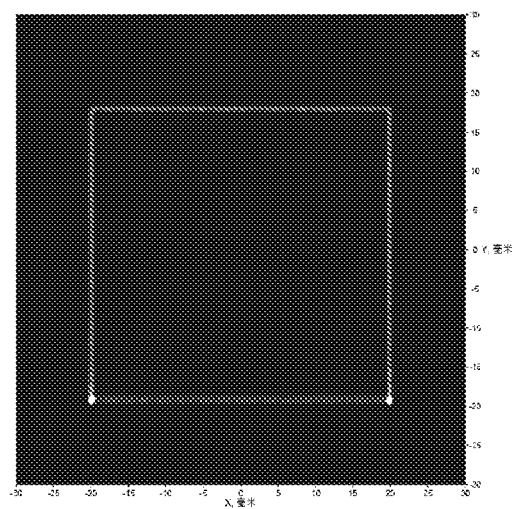
FIG. 4d is a conceptual diagram illustrating an illuminance distribution when the light passes through the lens with unequal thickness of the present disclosure and is projected on the receiving screen placed 2 meters away from the light source.
Figure 5:
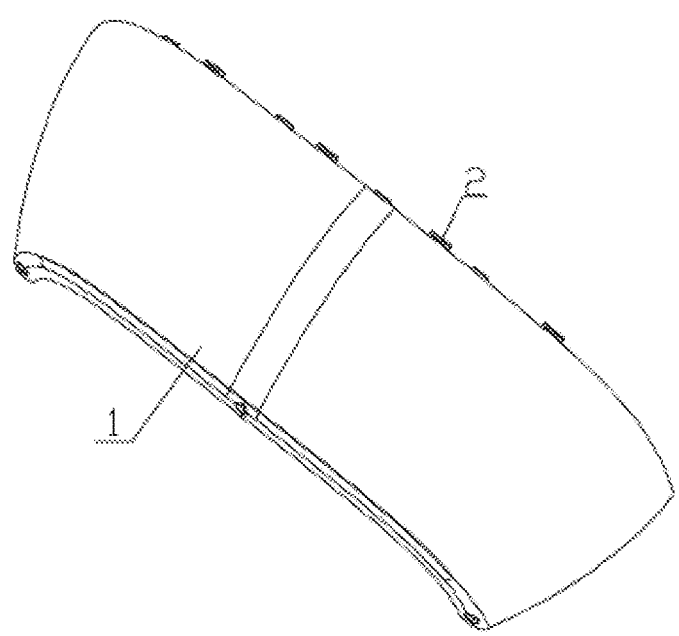
FIG. 5 is a first three-dimensional diagram illustrating an example structure of the AR optical mask lens of the present disclosure.
Figure 6:
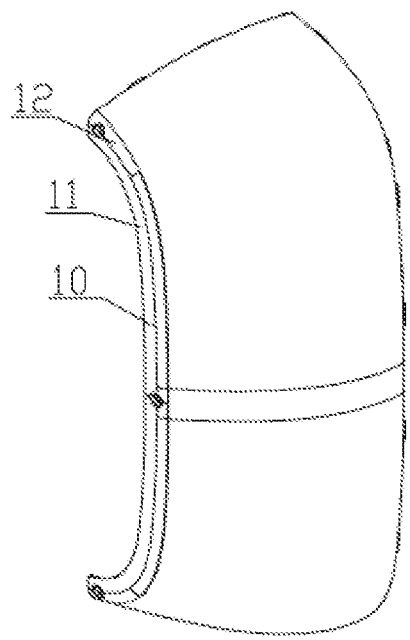
FIG. 6 is a second three-dimensional diagram illustrating an example structure of the AR optical mask lens of the present disclosure.
Figure 7:
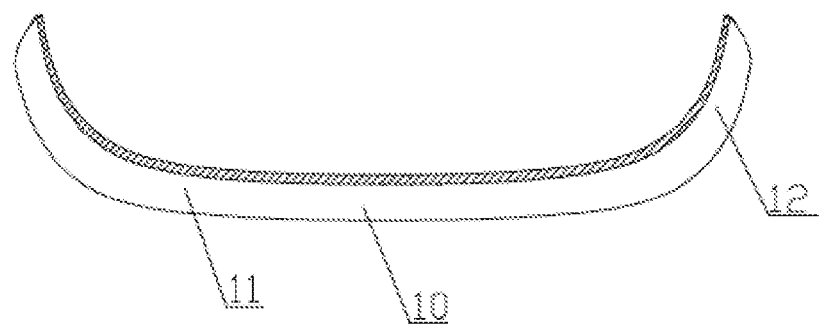
FIG. 7 is a third three-dimensional diagram illustrating an example structure of the AR optical mask lens of the present disclosure.

As shown in FIGS. 3a-3d, a conventional optical lens with equal thickness of 3 mm is placed between the light source and the receiving screen. The receiving screen is respectively placed 0.5 meters, 1 meter and 2 meters away from the light source, then the light source is turned on, and whether the position and size of the light pattern projected on the receiving screen vary is observed. The observation results show that, even if the light emitted by the light source is a parallel light, after passing through the conventional lens with equal length, the incident light and the exit light are unparallel. Moreover, when the distance between the receiving screen and the light source increases, the distance between the exit light and the incident light also increases. As shown in FIG. 3d, when the receiving screen is placed 2 meters away from the light source, the light in some areas is no longer received.

As shown in FIGS. 4a-4d, an optical lens with unequal thickness ranging from 3 millimeters to 2 millimeters is placed between the light source and the receiving screen. The receiving screen is respectively placed 0.5 meters, 1 meter and 2 meters away from the light source, then the light source is turned on, and whether the position and size of the light pattern projected on the receiving screen vary is observed. The observation results show that, despite the variation of distance between the receiving screen and the light source, the position and size of the light pattern projected on the receiving screen do not vary.

Certainly, in other embodiments, the thickness of the lens may be various.

According to the experimental results, a mold for manufacturing lens products is prepared according to the finished lens model in the optical software, and is then used for mass production of lens products. The lens has a lens center and a lens periphery, and the curvature radius of the lens gradually increases from the center of the lens to the periphery of the lens. The lens is made of plastic or glass. The lens is an aspheric lens, and the aspheric lens is a semi-ellipse, an arc trapezoid or a rectangle. In this embodiment, the lens is an AR optical mask lens.

The AR optical mask lens comprises a curved panel 1 and a plurality of buckles 2 evenly distributed along the edge of the curved panel 1. The curved panel 1 comprises a panel body and an arc-shaped portion 12 extending from the two sides of the panel body, wherein the panel body and the arc-shaped portion 12 define a semi-closed accommodating space. The thickness and the arc radius of the curved panel 1 are gradually increased from the arc-shaped portion 12 to the panel body. The thickness of the arc-shaped portion 12 ranges from 1.32 millimeters to 2.31 millimeters, and is gradually increased from one end away from the panel body to the other end close to the panel body. The thickness of the panel body ranges from 2.31 millimeters to 2.35 millimeters. As the thickness of the AR optical mask lens of the present disclosure is variable, through designing a variable curvature (free curvature) of unequal thickness, the distortion of image may be mitigated or eliminated. Thus, the image becomes clear, which protects the user from feeling dizzy after long-term use.

The panel body comprises a first panel body 11 arranged close to the arc-shaped portion 12 and a second panel body 10 arranged away from the arc-shaped portion 12. The thickness of the first panel body 11 is gradually increased from one end close to the arc-shaped portion 12 to the other end away from the arc-shaped portion 12, and the thickness of the second panel body 10 is gradually decreased from one end close to the arc-shaped portion 12 to the centerline of the second body 10. It should be noted that the aforesaid is merely a preferred embodiment of the present disclosure. In other embodiments, the curved panel 1 may also be a wave-shaped curved panel obtained through performing refractive index experiments. Namely, instead of gradually increasing or decreasing the thickness of the curved panel 1, the curved panel 1 is divided into a plurality of small segments, each of which may possess a few thickness values that differ slightly, and the plurality of small segments are combined to form a wave-shaped curved panel 1. For instance, if the curved panel is divided into N small segments, and the thickness of the segment N−1 is assumed to be a value a, then the thicknesses of the segment N−2 and the segment N may be greater than a. However, the overall design trend is to gradually increase or decrease the thickness of the curved panel 1, thus mitigating or eliminating the distortion to achieve a clear image.

The curvature radius of the inner wall of the panel body ranges from 6.3 millimeters to 432.3 millimeters, the curvature radius of the outer wall of the panel body ranges from 6.0 millimeters to 531.3 millimeters, and both of which are increased first and then decreased from one end of the first body 11 close to the arc-shaped portion 12 to the centerline of the second body 10. The curvature radius of the inner wall of the arc-shaped portion 12 ranges from 6.3 millimeters to 11.1 millimeters, and the curvature radius of the outer wall of the arc-shaped portion ranges from 6.0 millimeters to 11.5 millimeters, and both of which are decreased first and then increased from one end of the arc-shaped portion 12 away from the first body 11 to the other end close to the first body 11. Similarly, various curvatures are designed at intervals to adapt to the corresponding thicknesses, which makes the lines of the wave-shaped curved panel 1 smooth, and achieves a pleasing appearance, a better hand feel, and the elimination of distortion.

The buckle 2 protrudes out of the curved panel 1, and the buckle 2 comprises a clamping block perpendicular to the curved panel 1 and a groove which is recessed from one side of the clamping block to the interior of the clamping block. By means of the aforesaid design, the curved panel is buckled with corresponding parts of the AR optical mask lens. The structure is simple, the assembly and disassembly are easy, and the maintenance is convenient.

The AR optical mask lens further comprises fixing holes (not shown) formed in the side walls of the curved panel 1, which allows the curved panel to be fixed with other parts of the AR optical mask lens, achieving a simple structure and a high space utilization rate.

In conclusion, through the adjustment of the thickness between the incident surface and the exit surface of the optical lens, incident light is parallel to the exit light, which achieves clear imaging and zero distortion, so that the user is protected from feeling dizzy after long-term use.

The technical features of the above embodiments may be combined arbitrarily. To make the description concise, possible combinations of the technical features in the above embodiments are not wholly described. However, as long as there is no contradiction in the combinations of these technical features, they should be considered as the scope of this specification.

The above are merely a part of the embodiments of the present disclosure, the description of which is detailed, but it should not be understood as the limitation of the scope of the present disclosure. It should be noted that various improvements and modifications may be made by those skilled in the art without departing from the principles of the present disclosure, and thus all of which shall fall into the scope of the present disclosure. The scope of the present disclosure is defined by the claims.

What is claimed is:

1. A method for designing an optical lens with unequal thickness, comprising:
    establishing a optical lens model in an optical software, wherein establishing the optical lens model comprises determining a size of the optical lens and a thickness between an incident surface and an exit surface of the optical lens according to curvatures of the incident surface and the exit surface of the optical lens;
    simulating an light to enter through the incident surface and exit through the exit surface of the optical lens;
    determining whether the light enter through the incident surface and the light exit through the exit surface are parallel;
    recording the curvatures and thicknesses in response to determining that the light enter through the incident surface and the light exit through the exit surface are parallel;
    adjusting the thickness until the light enter through the incident surface and the light exit through the exit surface are parallel and recording the curvatures and the adjusted thickness in response to determining that the light enter through the incident surface and the light exit through the exit surface are unparallel;
    preparing the optical lens based on the recorded curvatures and thicknesses;
    determining whether the prepared optical lens requires fine adjustment, wherein determining whether the prepared optical lens requires fine adjustment comprises:
        arranging a light source and a receiving screen, wherein arranging the light source and the receiving screen comprises placing the receiving screen at a plurality of distances from the light source;
        recording a first position and a first size of a light projected on the receiving screen;
        placing the prepared optical lens in between the light source and the receiving screen;
        recording a second position and a second size of the light projected on the receiving screen; and
        determining whether the first position and the first size are the same as the second position and the second size;

determining the prepared optical lens requires fine adjustment in response to determining that the first position and the first size are not the same as the second position and the second size; and determining the prepared optical lens does not require fine adjustment in response to determining that the first position and the first size are the same as the second position and the second size;

obtaining a finished optical lens in response to determining that the prepared optical lens does not require fine adjustment; and adjusting the prepared the optical lens in response to determining that the prepared optical lens requires fine adjustment.

2. The method for designing an optical lens with unequal thickness of claim 1, wherein the light source is a parallel light source, and the light is a parallel light.

3. The method for designing an optical lens with unequal thickness of claim 1, wherein the prepared optical lens has a lens center and a lens periphery, and the curvature radius of the prepared optical lens gradually increases from the lens center to the lens periphery.

4. The method for designing an optical lens with unequal thickness of claim 3, wherein the prepared optical lens is made of plastic or glass.

5. The method for designing an optical lens with unequal thickness of claim 3, wherein the prepared optical lens is an aspheric lens, and the aspheric lens is a semi-ellipse, an arc trapezoid or a rectangle.

6. The method for designing an optical lens with unequal thickness of claim 1, further comprises preparing a mold for manufacturing the finished optical lens according to a finished optical lens model in the optical software.

* * * * *